United States Patent
Huff et al.

(10) Patent No.: US 6,408,391 B1
(45) Date of Patent: *Jun. 18, 2002

(54) DYNAMIC SYSTEM DEFENSE FOR INFORMATION WARFARE

(75) Inventors: Julie Lynn Huff; Tracy Glenn Shelanskey; Sheila Ann Jackson, all of Omaha, NE (US)

(73) Assignee: PRC Inc., McLean, VA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/073,648

(22) Filed: May 6, 1998

(51) Int. Cl.[7] .................................................. G06F 11/00
(52) U.S. Cl. ........................................................ 713/201
(58) Field of Search .............................. 713/200, 201, 713/202; 709/223, 224, 225

(56) References Cited

U.S. PATENT DOCUMENTS

| | | | | |
|---|---|---|---|---|
| 4,962,449 A | * | 10/1990 | Schlesinger ................. | 713/200 |
| 5,414,833 A | * | 5/1995 | Hershey ...................... | 713/201 |
| 5,557,742 A | | 9/1996 | Smaha et al. | |
| 5,745,692 A | * | 4/1998 | Lohmann ..................... | 709/233 |
| 5,805,801 A | * | 9/1998 | Holloway .................... | 703/201 |
| 5,919,258 A | * | 7/1999 | Kayashima ................. | 713/201 |
| 5,925,126 A | * | 7/1999 | Hsieh .......................... | 713/200 |
| 5,931,946 A | * | 8/1999 | Terada ........................ | 713/201 |
| 5,974,149 A | * | 10/1999 | Leppek ....................... | 380/25 |
| 5,987,135 A | * | 11/1999 | Johnson et al. ............... | 380/25 |
| 5,991,881 A | * | 11/1999 | Conklin et al. .............. | 713/201 |
| 6,125,390 A | * | 9/2000 | Touboul ..................... | 709/223 |
| 6,134,664 A | * | 10/2000 | Walker ...................... | 713/201 |
| 6,151,686 A | * | 11/2000 | McDonough .............. | 714/37 |
| 6,279,001 B1 | * | 8/2001 | DeBettencourt ........... | 707/10 |

FOREIGN PATENT DOCUMENTS

WO     WO 94/06096     3/1994

OTHER PUBLICATIONS

Asaka M., "Information–Gathering With Mobile Agents Intrusion Detection System", Institute of Electrical Engineers, Stevenage, GB, Transactions of the Institute of Electronics, vol. J81D–I, No. 5., May 1998 (Abstract).

Goan "A Cop on the Beat: Collectng and Appraising intrusion Evidence" Communications of the ACM, Jul. 1999/ol. 42 No. 7, pp. 46–52.*

Lin "A Case Study on Hunting A Brilliant Hacker" 1991 IEEE pp. 177–180.*

(List continued on next page.)

*Primary Examiner*—Robert Beausoleil
*Assistant Examiner*—Bryce P. Bonzo
(74) *Attorney, Agent, or Firm*—Lowe Hauptman Gilman & Berner, LLP (57) ABSTRACT

Disclosed is a method and apparatus which includes a security computer system capable of deploying and monitoring software agents on one or more nodes of a network of computers. The agents on each node include a framework agent and either a misdirection mission or a defensive mission. Upon an intrusion detection mission sending information to the security computer system indicative of an actual or suspected misuse or intrusion, the security computer system can automatically take countermeasures against the suspected or actual intrusion or misuse. Automatic countermeasures include using a defensive countermeasure to increase an auditing level conducted by the intrusion detection mission. A misdirection countermeasure mission is used to misdirect requests of the suspected or actual intruder or misuser. An offensive countermeasure is used to send a chase mission to the suspected or actual intruder. The offensive chase mission can either be automatically dispatched or dispatched with human intervention. The computer system includes a monitor for monitoring by a human system administrator.

21 Claims, 5 Drawing Sheets

OTHER PUBLICATIONS

Stoll "Stalking the Wily Hacker" Communications of the ACM May 1988 vol. 31 No. 5 pp. 484–497.* kluepfel "Foiling the Wiley Hacker: More then Analysis and Containment" 1989 ICCST, Zurich Switzerland, pp. 15–21.* www.cnn.com "Can you counter–attack hackers?".*

"The Ue of Real–Time Risk Analysis to Enable Dynamic Activation of Coutermeasures", L. Labuschagne, et al., Computers & Security International Journal Devoted to the Study of Technical and Financial Aspects of Computer Security, vol. 17, No. 4, Jan. 1, 1998 (pp. 347–357.

"A File Integrity Checking System to Detect and Recover from Program Modifiction Attacks in Multi–User Computer Systems", Robert A. McKosky, et al., Computers & Security International Journal Devoted to the Study of Technical and Financial Aspects of Computer Security, vol. 9, No. 5, Aug. 1, 1990 (pp. 431–446.

D. Denning, "An Intrusion–Detection Model", Proc 1986 IEEE Symp. Security & Privacy (Apr. 1986).

S. Snapp, et al, "DIDS (Distributed Intrusion Detection System)", Proc. 14th Nat'l Computer Security Conf., Washington, D.C. (Oct. 1991).

* cited by examiner

DYNAMIC SYSTEM DEFENSE FOR INFORMATION WARFARE

FIELD OF THE INVENTION

The present invention relates generally to intrusion detection systems for computer systems, and more particularly, relates to intrusion detection systems having dynamic response capabilities for suppressing and automatically taking countermeasures against suspected and actual intruders and misusers.

BACKGROUND OF THE INVENTION development of the computer and its astonishingly rapid improvement have ushered in the Information Age that affects almost all aspects of commerce and society. Just like the physical infrastructures that support the American economy, there is a highly developed computer infrastructure that supports the American and worldwide economy.

Besides traditional physical threats to United States security, the security of the United States is also dependent on protecting the computer infrastructure that supports American government and industry. The computer infrastructure is open to attack by hackers and others, who could potentially wreak havoc.

The President of the United States has recognized the existence of these infrastructures and has created the President's Commission on Critical Infrastructure Protection. This Commission was constituted to determine which industries are critical and whether these industries were vulnerable to cyber attack. The Commission issued a report and deemed transportation, oil and gas production and storage, water supply, emergency services, government services, banking and finance, electrical power and telecommunications to be critical infrastructures which rely on the computer infrastructure.

A personal computer and a modem access to the Internet are all the tools that a computer hacker needs to conduct a cyber attack on a computer system. The rapid growth of a computer-literate population ensures that millions of people possess the skills necessary to consider a cyber attack. The computer literate population includes recreational hackers who attempt to gain unauthorized electronic access to information and communication systems. These computer hackers are often motivated only by personal fascination with hacking as an interesting game. Criminals, and perhaps organized crime, might also attempt personal financial gain through manipulation of financial or credit accounts or stealing services. Industrial espionage can also be the reason for a cyber attack on a competitor's computer system. Terrorists may attempt to use the computer infrastructure. Other countries may use the computer infrastructure for national intelligence purpose. Finally, there is the prospect of information warfare, which is a broad, orchestrated attempt to disrupt a United States military operation or significant economic activity.

A typical secure computer network has an interface for receiving and transmitting data between the secure network and computers outside the secure network. A plurality of network devices are typically behind the firewall. The interface may be a modem or an Internet Protocol (IP) router. Data received by the modem is sent to a firewall which is a network security device that only allows data packets from a trusted computer to be routed to specific addresses within the secure computer network. Although the typical firewall is adequate to prevent outsiders from accessing a secure network, hackers and others can often breach a firewall. This can occur by cyber attack where the firewall becomes overwhelmed with requests and errors are made permitting access to an unauthorized user. As can be appreciated, new ways of overcoming the security devices are developed everyday. An entry by an unauthorized computer into the secured network, past the firewall, from outside the secure network is called an intrusion. This is one type of unauthorized operation on the secure computer network.

Another type of unauthorized operation is called a misuse. A misuse is an unauthorized access by a computer within the secure network. In a misuse situation, there is no breach of the firewall. Instead, a misuse occurs from inside the secure computer network. A misuse can be detected when an authorized user performs an unauthorized, or perhaps, infrequent operation which may raise the suspicion that the authorized user's computer is being misused. For example, an unauthorized user could obtain the password of an authorized user and logon to the secured network from the authorized computer user's computer and perform operations not typically performed by the authorized user. Another example might be where a terrorist puts a gun to the head of an authorized user and directs the authorized user to perform unauthorized or unusual operations.

There are systems available for determining a breach of computer security which can broadly be termed intrusion detection systems. Existing intrusion detection systems can detect intrusions and misuses. The existing security systems determine when computer misuse or intrusion occurs. Computer misuse detection is the process of detecting and reporting uses of processing systems and networks that would be deemed inappropriate or unauthorized if known to responsible parties. An intrusion is an entry to a processing system or network by an unauthorized outsider.

These existing computer security systems have audit capabilities which are passive. These systems collect audit information from network devices and format those audits for review. Most of the existing computer security systems known to the inventors do not take steps to stop the misuse or intrusion after it is detected. Those that do take active steps are limited to logging a user off the network, stopping communications with that computer halting operations or other forms of notification such as a message to the security officer. Manual countermeasures are necessary. Once a hacker or intruder enters a critical system computer, even if detected, the hacker may do considerable harm before an operator of the system can react and initiate an appropriate, manual countermeasure, to stop the misuse or intrusion or to positively identify the hacker. Thus, a need exists for a system which can automatically take defensive steps to stop a misuse or intrusion after it is detected. A further need exists for a system which can take offensive steps, either automatically or with human intervention, to learn more information about an intruder and perhaps disable the intruder.

SUMMARY OF THE INVENTION

It is, therefore, an object of the present invention to substantially overcome the above-identified problems and substantially fulfill the above-identified needs.

A further object is to automatically take countermeasures against an intruder or misuser.

Another object is to automatically take offensive steps against an intruder by sending an agent to the intruder's computer system.

An additional object is to automatically take defensive steps to halt further intrusion or misuse.

These and other objects of the present invention are achieved by a method and apparatus for receiving information that an intrusion or misuse has occurred and taking countermeasures on a computer network. The computer network includes a plurality of network devices such as computers, hosts, servers and terminals, all coupled to a network communications media for monitoring the network for intrusion and misuse. Although a security device such as a firewall is typically in place to prevent intruders from accessing the computer network, hackers can often gain entry to the computer network. Also, although internal users have passwords and the like, misuse of the computer network occurs from computers within the network because misusers obtain the necessary passwords, etc. A security computer is coupled to the network communications media and includes software for deploying software agents on each of the network devices, and monitoring and controlling the deployed agents. Each agent is a computer software module which is capable of being transported from one computer to another under instruction from the security computer. The security computer receives information from agents who perform the functions of monitoring the computers on the network for misuse and intrusion and send information to the security computer indicative of suspected or actual intrusions or misuses. The security computer can then take defensive and/or offensive measures to suppress or counter-attack the intruder or misuser by automatically sending defensive or offensive agents to the computer on which a suspected or actual intrusion or misuse occurred. The security computer includes a monitor for monitoring by a human system administrator.

These and other objects of the present invention are achieved by a method for a computer network including receiving information, at a security computer, that an unauthorized operation has occurred at a computer on the network. Based on this information, countermeasures are initiated automatically, from the security computer, against the unauthorized operation where the determined unauthorized operation occurred.

These and other objects of the present invention are achieved by a method for a computer network including receiving information, at a security computer, that an unauthorized operation has occurred at a computer on the network. Based on this information, countermeasures are taken from the security computer against the intrusion. The countermeasures include dispatching a transferable self-contained set of executable instructions to the identified audited computer and executing the set of executable instructions on the identified audited computer to implement the countermeasure.

These and other objects of the present invention are achieved by a computer network comprising a security computer including one or more software modules for deploying, controlling and monitoring agents on one or more nodes of the computer network. Each of the one or more computers on the computer network includes a security operative which includes at least one offensive mission for taking countermeasures against an unauthorized operation and a misdirection mission for misdirecting further unauthorized operations.

These and other objects of the present invention are achieved by a computer system including a processor. A network interface couples computers on a computer network. A memory stores executable code for taking a countermeasure and is coupled to the processor. The memory has stored therein sequences of instructions, which, when executed by the processor, cause the processor to perform the step of receiving information that an unauthorized operation has occurred on a computer on the computer network. The processor then takes countermeasures against the unauthorized operation at the audited computer including dispatching a transferable self-contained set of executable instructions to the determined computer. The computer system then causes the set of executable instructions to be executed on the determined computer to implement the countermeasure.

These and other objects of the present invention are achieved by a security computer architecture including receiving means for receiving information that an unauthorized operation occurred on the computer network. The computer architecture includes determining means for determining that an unauthorized operation has occurred at an audited computer based on the received auditing information. The computer architecture includes countermeasure means for automatically initiating countermeasures against an unauthorized operation at the audited computer.

These and other objects of the present invention are achieved by a computer readable medium having agents stored thereon. The computer readable medium has stored thereon at least one data collection agent for monitoring for an unauthorized operation on a computer within a computer network and reporting back to a security computer. The computer readable medium has stored thereon at least one misdirection agent for misdirecting requests by an actual or suspected intruder or misuser to a location in the monitored computer where the actual or suspected intruder obtains false information. The computer readable medium has stored thereon at least one offensive agent for taking countermeasures against an actual or suspected intruder to prevent or suppress further intrusion by the actual or suspected intruder.

Still other objects and advantage of the present invention will become readily apparent to those skilled in the art from following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

A method and apparatus for intrusion suppression and for taking countermeasures according to the present invention are described. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Figure 1:
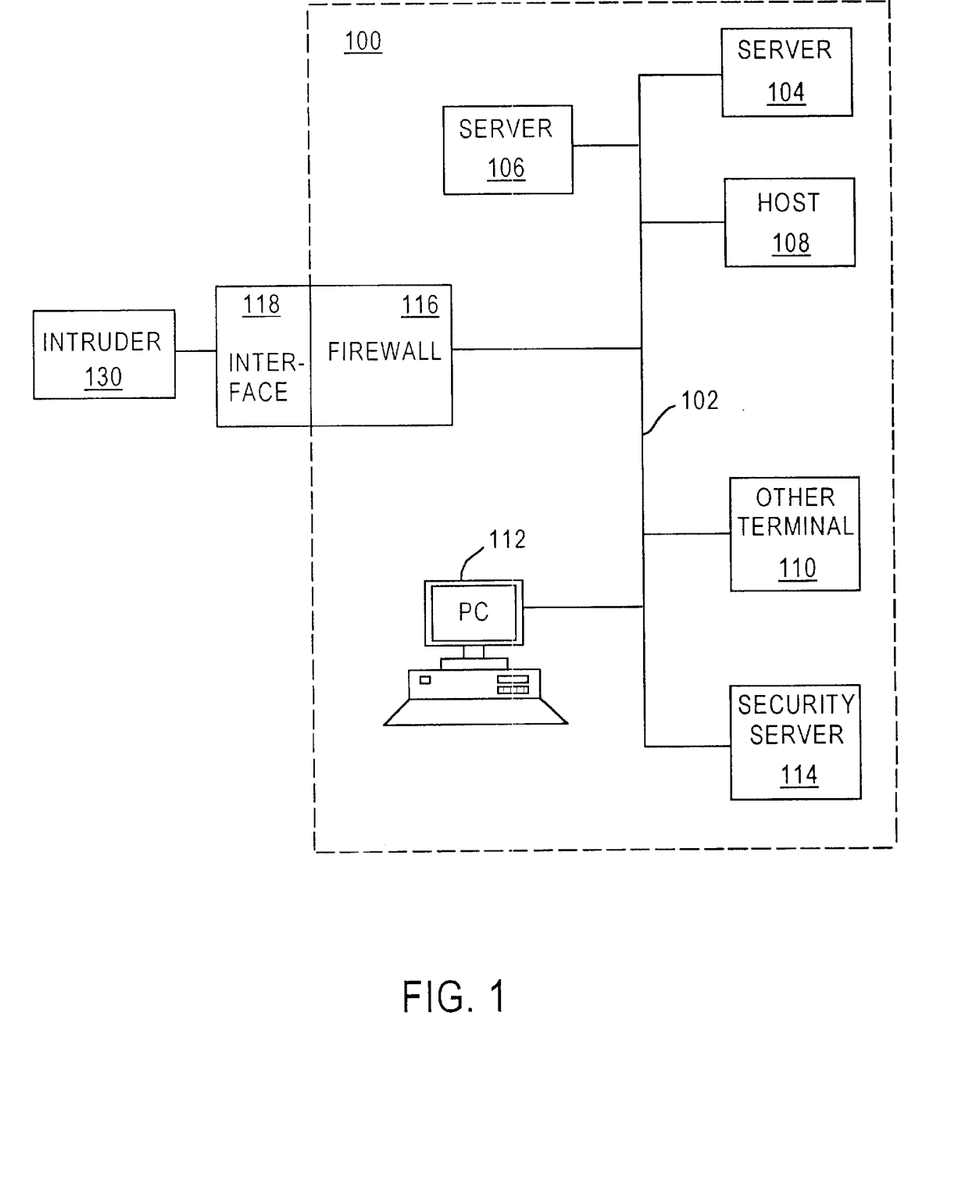
FIG. 1 is a high-level block diagram of an exemplary secured computer network on which the present invention can be implemented.

FIG. 1 is a block diagram illustrating an exemplary computer network 100 including a plurality of network devices on which an embodiment of the invention may be implemented. The network devices include devices such as hosts, servers and personal computers. The present invention is usable on such networks as ARCnet, Ethernets and Token-Ring networks, wireless networks, among other networks. The network 100, in this example, has a central network cable 102, also known as media, which may be of any known physical configuration including unshielded twisted pair (UTP) wire, coaxial cable, shielded twisted pair wire, fiber optic cable, and the like. Alternatively, the network devices could communicate across wireless links.

The network 100 includes a network server 104 coupled to the network cable 102 and another server 106 coupled to the network cable 102. A host computer 108 is coupled to the network cable 102. A terminal 110 is coupled to the network cable 102. A personal computer 112 is coupled to the network cable 102. Each network device 104, 106, 108, 110, 112 can also be considered a node because each device has an addressable interface on the network. As can be appreciated, many other devices can be coupled to the network including additional personal computers, mini-mainframes, mainframes and other devices not illustrated or described which are well known in the art.

A security server 114 for implementing the intrusion detection, suppression, and countermeasure system according to the present invention is coupled to the network cable 102. A firewall 116 connects the secure network 100 to an interface 118. The firewall 116 is a combination hardware and software buffer that is between the internal network 100 and external devices outside the internal computer network 100. The network devices within the internal network 100 appear within the dashed lines in FIG. 1, and the external devices outside the internal network appear outside the dashed lines in FIG. 1. The firewall 116 allows only specific kinds of messages from external devices to flow in and out of the internal network 100. As is known, firewalls are used to protect the internal network 100 from intruders or hackers who might try to break into the internal network 100. The firewall 116 is coupled to an interface 118. The interface 118 is external to the network 100 and can be a modem or an Internet Protocol (IP) router and serves to connect the secure network 100 to devices outside the secure network. For illustrative purposes, an intruder computer system is depicted at 130.

Figure 2:
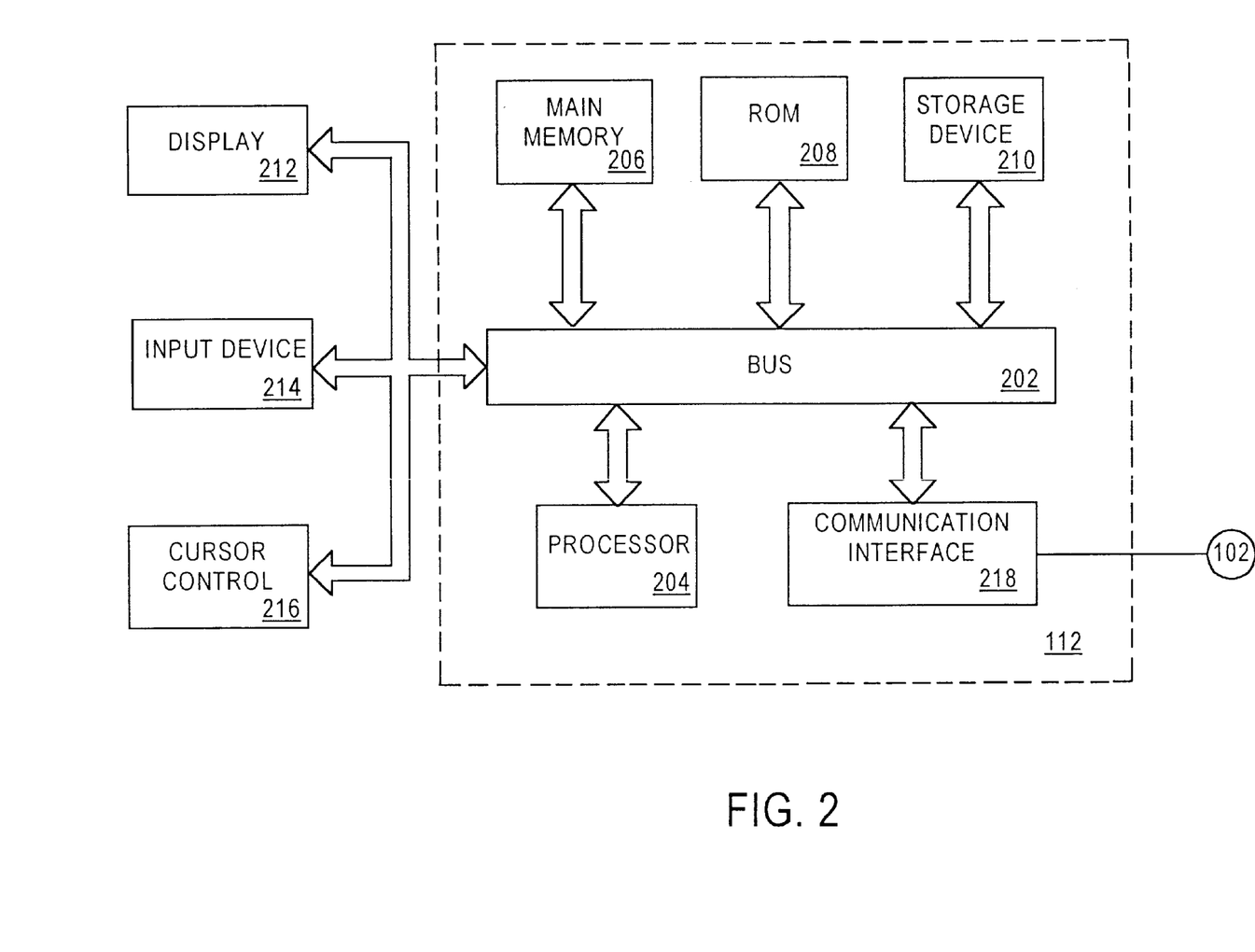
FIG. 2 is a high-level block diagram of an exemplary computer system with which the present invention can be implemented.

FIG. 2 is a block diagram illustrating an exemplary computer system, such as the personal computer 112 depicted in FIG. 1, usable on the internal secure network 100. The present invention is usable with currently available personal computers, mini-mainframes, mainframes and the like. Although computer 112 is depicted in FIG. 1 as a network device which is part of a wired local network, the computer 112 is also envisioned as being connected to the network 100 by a wireless link. In this regard, the computer 112 is usable in the cockpit of an aircraft, on a ship and in moving land vehicles. It is believed that the invention described herein can readily be adapted for specific hardware configurations for each of these operating environments.

Computer system 112 includes a bus 202 or other communication mechanism for communicating information, and a processor 204 coupled with the bus 202 for processing information. Computer system 112 also includes a main memory 206, such as a random access memory (RAM) or other dynamic storage device, coupled to the bus 202 for storing information and instructions to be executed by processor 204. Main memory 206 also may be used for storing temporary variables or other intermediate information during execution of instructions to be executed by processor 204. Computer system 112 further includes a read only memory (ROM) 208 or other static storage device coupled to the bus 202 for storing static information and instructions for the processor 204. A storage device 210, such as a magnetic disk or optical disk, is provided and coupled to the bus 202 for storing information and instructions.

Computer system 112 may be coupled via the bus 202 to a display 212, such as a cathode ray tube (CRT) or a flat panel display, for displaying information to a computer user. An input device 214, including alphanumeric and other keys, is coupled to the bus 202 for communicating information and command selections to the processor 204. Another type of user input device is cursor control 216, such as a mouse, a trackball, or cursor direction keys for communicating direction information and command selections to processor 204 and for controlling cursor movement on the display 212. This input device typically has two degrees of freedom in two axes, a first axis (e.g., x) and a second axis (e.g., y) allowing the device to specify positions in a plane.

The processor 204 can execute sequences of instructions contained in the main memory 206. Such instructions may be read into main memory 206 from another computer-readable medium, such as storage device 210. However, the computer-readable medium is not limited to devices such as storage device 210. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 206 causes the processor 204 to perform the process steps described below. In alternative embodiments, hard-wired circuitry may be used in place of or in combination with software instructions to implement the invention. Thus, embodiments of the invention are not limited to any specific combination of hardware circuitry and software.

Computer system 112 also includes a communication interface 218 coupled to the bus 202. Communication interface 218 provides a two-way data communication as is known. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. In the preferred embodiment the communication interface 218 is coupled to the network cable 102. Wireless links may also be implemented. In any such implementation, communication interface 218 sends and receives electrical, electromagnetic or optical signals which carry digital data streams representing various types of information. Of particular note, the communications through communication interface 218 may permit transmission or receipt of the intrusion detection, suppression and countermeasure agents for taking countermeasures against suspected or actual intruders or misusers.

Figure 3:
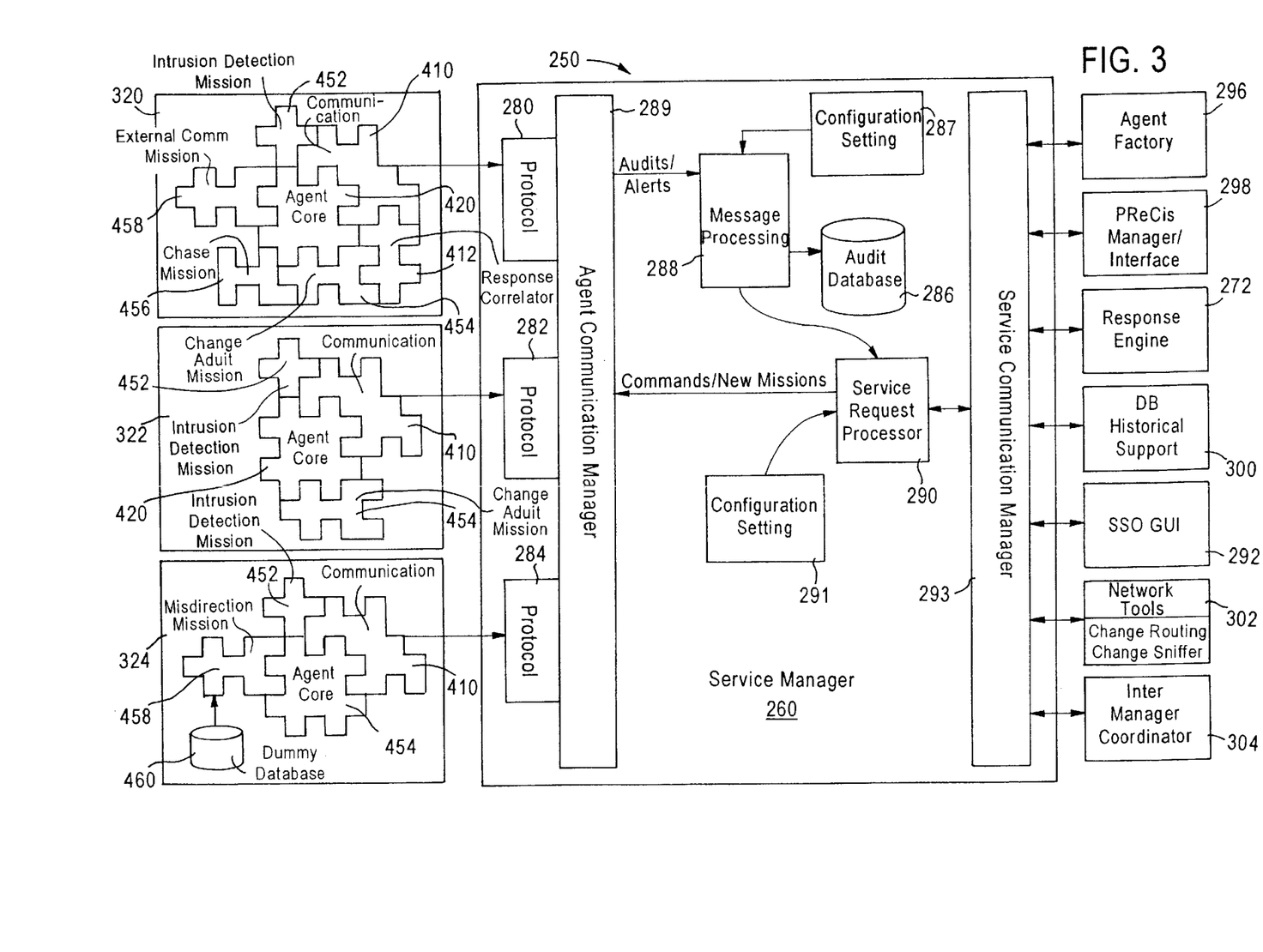
FIG. 3 is a block diagram of a logical architecture of the system according to the present invention.

The logical architecture of one embodiment of the suppression and countermeasure system 250 of the present invention is illustrated in FIG. 3 and can be implemented on the physical network described above and depicted in FIG. 1. The suppression and countermeasure system 250 of the present invention includes two building blocks: a service manager 260 on the network security server 114 and dispersed security operatives 320, 322, 324. As discussed in detail below, the network security server 114 is located on one or more computers in the secure network 100 and the security operatives 320, 322, 324 are located at remote computers within the network 100 and dispatched, controlled and monitored by the security server 114.

The intrusion suppression and countermeasure system of the present invention includes the security server 114 of FIG. 1, the logical architecture of which is depicted in greater detail in FIG. 3. The service manager 260 includes an agent communication manager 289, a message processing module 288, a configuration setting module 287, an audit database 286, a service request processor module 290, a configuration setting module 291 and a service communication manger 293. The agent communication manager 289 has communication protocols 280, 282, 284 for exchanging information with security operatives 320, 322, 324. The service manager 260 includes message processing module 288 for receiving audits/alerts from agent communication manager 289. The message processing module 288 is coupled to a configuration setting module 287 and an audit database 286. The message processing module 288 sends information to a service request processor module 290. The service request processor module 290 is coupled to a configuration setting module 291 and to a service communication manager 293. The service communication manager 293 is in turn coupled to an agent factory module 296, an intrusion detection interface module 298, a response engine module 272, a DB historical support module 300, a network tools module 302 and an inter manager coordinator module 304. Response engine module 272 provides functionality for determining the response that the suppression and countermeasure system should take in response to a threat from an intruder or misuser. A system security officer graphical user interface (SSOGUI) module 292 provides an interface to a human security officer. Modules 272, 292, 296, 298, 300, 302, 304 reside outside of the service manager 260. The agent factory module 296 provides new agents that can be adapted to new situations. The intrusion detection mission interface module 298 provides an interface to the intrusion detection missions 452. The DB historical support module 300 provides a database of historical information regarding previous threats and misuses and is used by the response engine module 272 in formulating responses. The network tools module 302 is used to change routings between modules and missions and is used to change sniffers. A computer in a sniffing mode can capture information including a packet header having the address of another computer. The inter manager coordinator 304 manages communications to other additional service managers 260. In a wireless network without the firewall 116, the network cable 102 could be a wireless path or a combination of wired and wireless paths. For example, in a non secured environment, the signal path 102 could be the Internet.

The service request processor module 290 dispatches the dispersed security operatives 320, 322, 324 to other network devices such as servers 104, 106, host 108, terminal 110, and PC 112. The service request processor module 290 also initiates the instantiation of the security operatives 320, 322, 324 on the remote computers. Each network device has a security operative residing thereon. For simplicity, in FIG. 3, only the security operatives 320, 322, 324 are depicted which reside at the host 108 and PC 112, respectively.

An intruder system is depicted as the block 130 in FIG. 1. The intruder, by definition, must be outside the secured network. Of course, the intruder 130 does not form a part of the present invention but is being shown for illustrative purposes only. The intruder is often a hacker. An intruder 130 can use a PC with a modem or other communication link. For purposes of this patent application, it can be assumed that even though the firewall 116 provides some degree of protection, hackers will be able to gain access to one or more of the devices on the network 100 and thus intrude into the secured network 100. By contrast, a misuser is using a network device from within the secured network 100.

Each network device such as server 104, host 108 and PC 112 usually will be referred to herein as nodes. As used herein, a node is an addressable point on a network. A node can connect a computing system, a terminal, or various other peripheral devices to the network. Nodes 104, 108, 112, for example, can communicate with each other via signal path 102.

Alternatively, instead of networking computers 104, 108, 112 via signal path 102, there can be individual signal paths between each computer and the security server 114. Additionally, the security server 114 can also be in communication with a plurality of networks, each having two or more computers or nodes.

As depicted in FIG. 3, on each node 104, 108, 112 resides the security operatives 320, 322, respectively. Each security operative 320, 322, 324 includes a communication framework 410 and an agent core framework 420 and at least one mission, each of which is a software module. To initially configure the communication framework 410 and 420 on the secure network 100, the service request processor module 290 sends configuration segments to each of the nodes on the network. These configuration segments are then instantiated on a respective node as the communication framework 410 and the agent core framework 420. In the presently preferred embodiment, the communication framework 410 and the at least one mission are each known as agents. Functionally, an agent is computer software, transportable over a computer network from one computer to another, to implement a desired function on the destination computer. An agent can also be defined as a transferable self-contained set of executable code instructions. A response correlator 412 can provide some of the functionality of the response engine module 272. Advantageously, the response correlator 412 can sometimes eliminate the need for the remote agents 452–458 to communicate with the response engine.

From a code perspective, the preferred agents are collections of Java classes combined with a collection of persistent objects. The communication framework 410 and agent core framework 420 are at least one of these Java classes. Each agent also includes a collection of named objects, called the persistent store. Objects can be added and deleted from the persistent store at any time.

All communications between nodes 104, 108, 112 occurs through a respective communication framework 410 each of which tracks objects and maintains one or more agent ports. The communication framework 410 and the agent core framework 420, as agents, can be moved from node to node although typically resides at only a single node. All communications between the message processing module 288 and the nodes 104, 108, 112 occurs through a respective communication framework 410.

As depicted in FIG. 3, the security operatives 320, 322, 324 each include missions such as an audit and intrusion detection mission 452, a change audit mission 454, and a chase mission 456, which are discussed in detail below. Like the communication framework 410, these missions preferably are Java agents. To configure a mission at a communication framework 410, the service request processor module 290 sends a reconfiguration segment to a particular node on the network where the mission is to be deployed. The reconfiguration segment is then instantiated as the mission under instructions from the service request processor module 290.

As will be explained below, many other missions are possible. The agents can be also written in many languages such as C++, C and assembler and other languages known to those of skill in this art.

It should be noted that different or common entities may control the secure network 100 and nodes 104, 108 and 112. For example, network 100 and nodes 108, 112 may be owned by one company or the military and thus are under the control of one entity. Alternatively, different entities may control the network 100 and each of the nodes. For example, a system administrator may control the network 100 and each of the nodes 104, 108, 112 is owned by different companies who might be concerned about preventing a cyber attack and responding to a cyber attack.

It is important that the communication framework 410 and agent core framework 420 have full permission to use and access every resource on the host computer 108 or 112, to append, delete, modify, and rewrite files. In a UNIX environment, for example, the communication frameworks 410 and agent core framework 420 would reside at the root access level and thus have fall permission to use every resource on the host UNIX computer. The communication framework 410 tracks missions and sends and receives them from one port to another. The communication framework 410 also enables missions to communicate back and forth to the server 114. The agent core framework 420 has an open architecture and each of the missions is plugged into the agent core framework 420. The agent core framework 420 is thus able to accept different and or additional missions. The agent core framework 420 can work on any hardware platform such as a mainframe, mini-mainframe or personal computer and any operating system such as UNIX, OS/2 or Windows NT and is preferably coded in Java but other native languages can be used. For example, on a UNIX platform, C programming language would be used.

The security server 114 can always be in communication with the communication framework 410 so long as a respective node is in a power on condition. This is important to prevent the frameworks 410 and 420 and each of the missions from being subverted. In this regard, the communication framework 410 handles authentication issues. Communication between the nodes 320, 322, 324 is encrypted and compressed and a digital key is used. During a communication between the security server 114 and the communication framework 410, information is sent regarding the size of the communication. If the size of the communication is larger or smaller than expected, it can be assumed that there is a security problem. For example, if the communication function is expecting a communication of 212 kilobits and 214 kilobits is received, then that information will not be processed by the communication framework 410.

The agent core framework 420 includes code necessary for each of the missions to run on a respective node 104, 108, 112 and locally manages each of the missions. The agent core network 420 can receive new missions from the service request processor module 290 and instantiate the new mission on that node based on instructions received from the service request processor module 290. Instantiation is the reserving of memory space and the initializing of the new mission. Under instruction from the service request processor module 290 the agent core framework 420 can receive a mission from another node, can shut off missions on that node, and delete missions if necessary on that node.

Thus, the service request processor module 290 remotely controls the frameworks 410 and 420 and each of the missions 452, 454, 456, 458. Besides starting a mission by having the mission instantiated at a node, the service request processor module 290 also tracks each instance of each mission. This is achieved by having the agent core framework 420 periodically send information to the service request processor module 290 regarding the currently active missions acting at that node.

Once the frameworks 410 and 420 are in place at each of the nodes, the service request module 290 can deploy data collection agents such as intrusion detection mission 452, and collect data from data collection agents and store the collected data in the audit database storage unit 286. The service request processor module 290 can send a new mission to a communication framework 410 on a node as instructed by the network tools module 302.

User profile data is stored in the audit database storage unit 286. This data may be used to detect an intrusion. For example, a user may have access to a particular database but has not accessed the database for over a year. The sudden access of the database may be inconsistent with the user profile as determined by the network tools module 302. This may be an alert that a misuse might be occurring but because the user is performing a legal operation the network tools module 302 may direct the service request processor module 290 to increase the auditing level being performed by the intrusion detection mission 452 and send out a change audit mission 454.

The service request processor 290 provides for system protection which might include shutting down a node when a suspected intrusion occurs or when a node has been subverted. Another type of system protection may be when an agent or mission does not report back for a certain period of time and it may be assumed that the agent or mission has been killed or subverted. Subverted means that the system, agent or mission has been killed or corrupted by an intruder or misuser.

The response engine module 272 analyzes collected and stored data, detects and characterizes intrusions and misuses, searches a countermeasure database which is stored in the audit database storage unit 286, instructs the service request processor module 290 to dispatch countermeasure agents, monitors for intrusions and misuses, and profiles user data and stores the same in the audit database storage unit 286. The message processing module 288 determines and identifies data collection requirements and instructs the service request processor module 290 to dispatch threat deflection and misinformation missions. Thus, advantageously, in most situations, the suppression and countermeasure system of the present invention can take automatic, and virtually instantaneous action to counteract an actual or suspected threat. Prior art systems only provide alerts to a system administrator who then takes action. Because prior art systems require human intervention, and because cyber attacks can occur with speed beyond that of a human, prior art systems can be circumvented before the human system administrator takes action.

Figure 4:
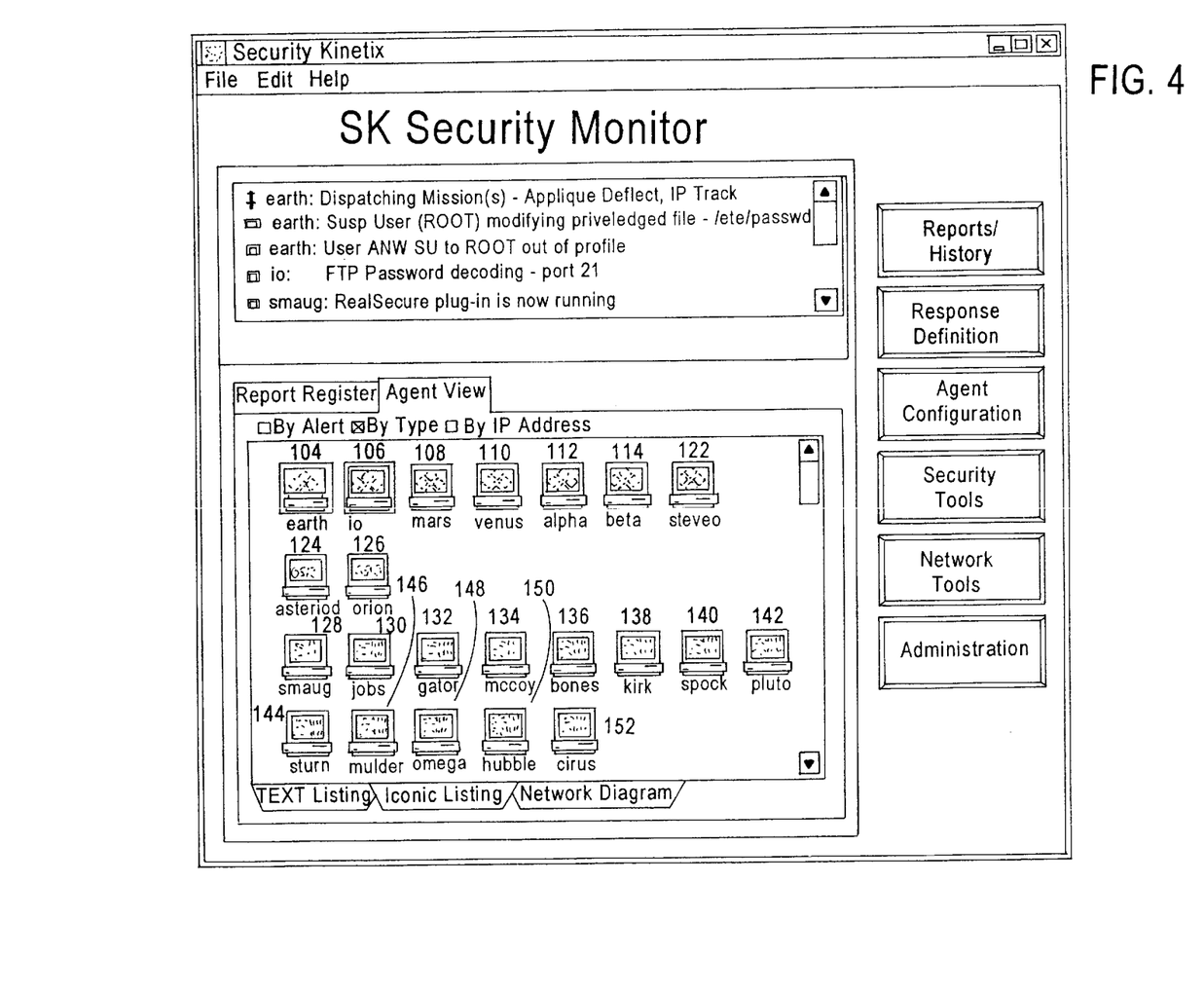
FIG. 4 is an illustration of a display screen depicting the status agents on nodes on a computer network.

The monitor associated with GUI 292 of security server 114 displays the nodes and the agents and missions on each node and the status of each as depicted in FIG. 4. As depicted in FIG. 4, there are twenty-two network devices currently being monitored: 104, 106, 108, 110, 112, 114, 122, 124, 126, 128, 130, 132, 134, 136, 138, 140, 142, 144, 146, 148, 150, 152. The monitor or interface module 292 displays messages including new computers added. The monitor also displays alerts and current system information, such as an identified suspected intruder. If a suspected intruder is identified that is not on the system, it may be necessary for the system administrator to obtain a warrant from the proper legal authorities before an offensive mission is sent to the suspected intruder. This is because the sending of an agent may constitute a legal trespass.

Missions can be divided into three main categories. The first category is the "defensive" category which includes the intrusion detection mission 452 and the change audit mission 454. The present invention is an intrusion suppression and countermeasure system and uses the intrusion detection mission 452 to provide information regarding suspected or actual intrusions or misuses. The software agents implementing these missions perform defensive activities to determine the possible existence of a security breach. These missions are informational missions. Information obtained from these missions can be used to obtain a warrant. The second mission category is the "misdirection" category which includes the misdirection mission 458. The software agent of a misdirection mission redirects requests for data from a suspected or actual intruder or misuser, typically to a dummy database that has been set up to keep the suspected intruder or misuser from accessing useful information. The third mission category is the "offensive" category, where an agent is dispatched to a computer on which a suspected or actual intruder resides. Once the agent is deployed at the intruder's computer, an offensive agent can be used to obtain information about the suspected intruder or be used to disable the intruder.

All missions report back to the message processing module 288 periodically. When the response engine module 272 detects a suspected intrusion or misuse or an actual intrusion or misuse, then the response engine module 272 alerts the service request processor module 290, which request the agent factory module 296 dispatch an additional mission.

As previously mentioned, the communications framework 410 and the agent core framework 420 at each node has the intrusion detection mission 452, the change audit mission 454, and the chase mission 456, and on the node 112 the frameworks 410 and 420 also have the misdirection mission 458. It should be understood that the present invention is not limited to the exemplary missions described herein but many other missions and combinations of missions within each node are possible.

The audit intrusion detection mission 452 can be a specially developed software program as described in a copending U.S. patent application entitled "Method and System for Normalizing Audit Trail Records Received from Heterogeneous Sources" and "Method and System for Detecting Intrusion into and Misuse of a Data Processing System" both of which are assigned to the instant assignee and filed on even date herewith and both of which are incorporated by reference in their entirety into this specification. The audit and intrusion detection mission 452 can either (1) provide an audit trail of operations on the node at which the mission resides and send this audit trail to the message processing module 288 or (2) detect intrusions or misuses on the node on which it resides and send an alert to the message processing module 288. An intrusion is an access by a computer outside the computer system or network being monitored. A misuse is a use by a computer within the computer system or network being monitored which is not a normal use for that computer or operator using the computer. The audit and intrusion detection mission 452 is capable of determining and reporting an instance of intrusion or misuse but is not capable of taking any significant offensive or countermeasure actions to prevent or halt the intrusion or misuse. The intrusion detection mission can take the form of commercially available software such as Netstalker described in U.S. Pat. No. 5,557,742. Typically, a monitored node would have an intrusion detection mission 452 to monitor for intrusions and misuses. The intrusion detection mission 452 reports its audits to the message processing module 288 which stores the audits in the audit database module 286.

Some illustrative examples of intrusion and misuse are provided but the intrusion detection mission 452 is certainly not limited to detection of these simple examples. Examples of misuse include a computer accessing a database which it does not normally access. An example of an attempted intrusion includes a login by a computer which does not have access to the system. Another example would be an attempted logon which tried to login three times but failed. Intrusion symptoms can also include excess system calls, too many root logins, and system memory changes.

The change audit mission 454 changes the audit level being conducted by the intrusion detection mission 452. This mission would have been dispatched by the service request processor 290 after being alerted by either the response engine module 272 or the intrusion detection mission 452 of a suspected or actual intrusion or misuse. Any type of anomalous behavior may warrant additional auditing of a computer node before taking any other defensive or offensive countermeasures. As mentioned previously, because of the speed of a cyber attack, more frequent auditing may be required to detect a cyber attack once a suspected or actual intrusion or misuse is detected.

The chase mission 456 is an offensive agent which is deployed by the response engine module 272 or by the audit and intrusion detection module 452 instructing the service request processor 290 to dispatch the chase mission 456 to the node from which the suspected intrusion is taking place. As depicted in FIG. 3 the intruder is 130. The chase mission 456 can send back to the service manager 260 information regarding the suspected intruder including the suspected intruder's address and information contained on the suspected intruder's computer, and other information.

The misdirection mission 458 might include a "Trojan horse" which could be downloaded to place a chase mission 456 in the suspected intruder 130. The Trojan horse is a subversive device placed within the computer system of the suspected intruder. A Trojan horse is advantageous because it is possible for a hacker to disguise the address where the hacker is located. Thus, it may not be possible to directly send the chase mission 456 to the hacker. Instead, it may be necessary to use a Trojan horse which is unknowingly downloaded by the hacker and thus the chase mission 456 can be sent to the computer which the hacker is using. The chase mission 456 will frequently reside within a dummy database 460 created by the misdirection mission 458 and will be downloaded by the suspected intruder 130 and the chase mission 456 will thus travel to the computer system of the suspected intruder. The chase mission 456 can then send information regarding the location of the suspected intruder and information about the suspected intruder to the message processing module 288. The chase mission 456 being within the Trojan horse is very useful because it is often difficult to determine the address of the suspected or actual intruder. Thus, it may be necessary to have the suspected or actual intruder download the Trojan horse containing the chase mission 456 to determine the address and capabilities of the suspected or actual intruder.

Alternatively, the suspected intruder may download false information contained in the dummy database 460 as depicted in FIG. 3. The dummy database 460 also can be used to keep the suspected intruder interested while information is being gathered about the suspected intruder. It may be possible to determine the address of the suspected intruder if enough time is available to track down the suspected intruder without the necessity of sending out a chase mission 456. It may also be possible to send information to the suspected intruder once the chase mission 456 is instantiated at the site of the suspected intruder. It may also be possible to send a chase mission 456 which either destroys or disables an actual intruder. Most importantly, the chase mission 456 attempts to determine the original source of the intrusion and send that information back to the computer network.

The suppression and countermeasure system of the present invention can take defensive steps to prevent or suppress unauthorized operations at nodes being monitored within the network 100. Advantageously, the present invention can also take offensive countermeasures at computers not within a monitored network 100.

Figure 5:
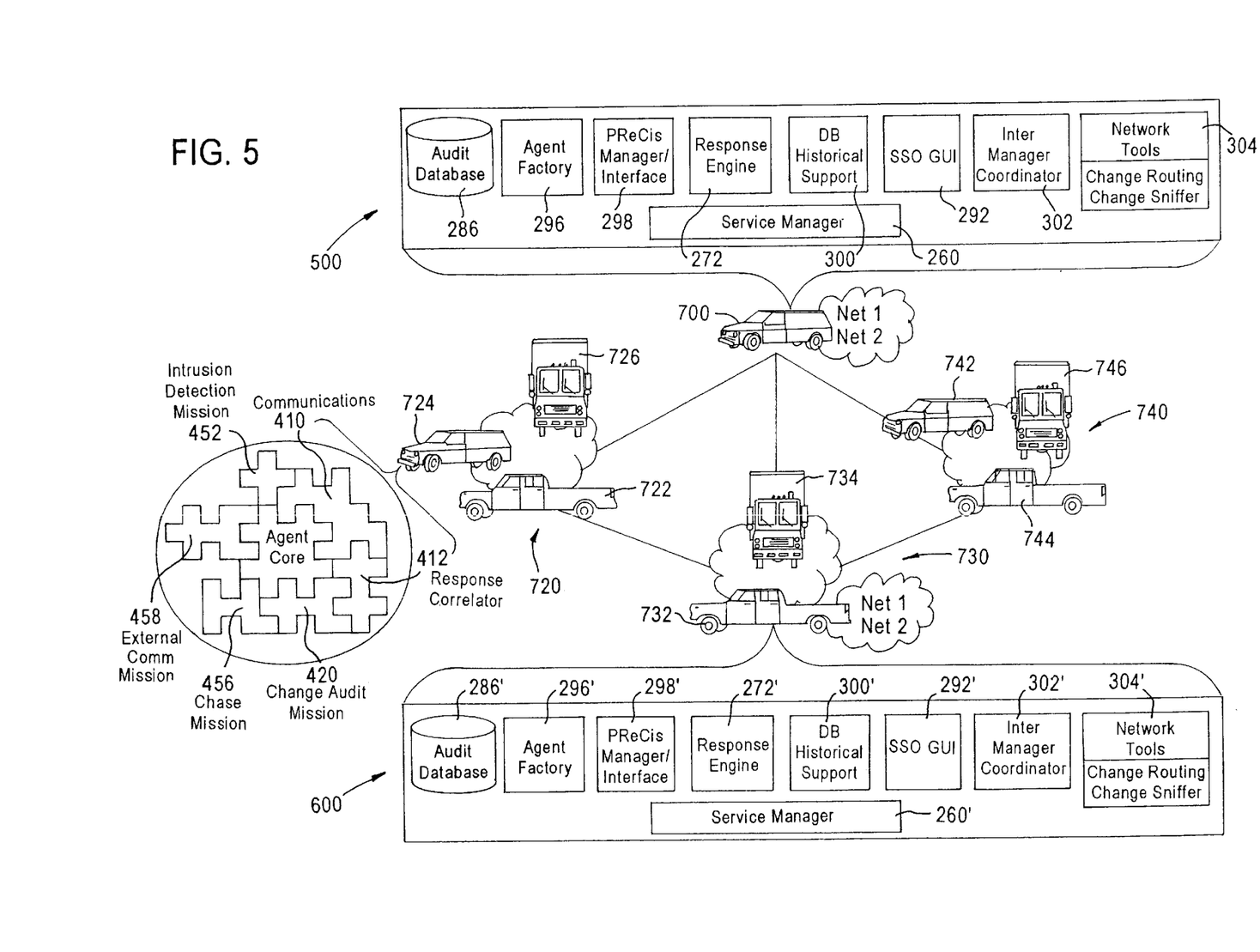
FIG. 5 is a diagram of a first embodiment of the invention as used on several fleets of trucks in a wireless network.

FIG. 5 depicts a deployment of a proposed network using the suppression and countermeasure system of the present invention. The system includes two monitoring systems 500, 600 each of which corresponds to the service manager 260 and associated modules discussed above with respect to FIG. 3.

There are two wireless networks NET1 and NET2 used at different frequencies in the event that either of the service managers 260, 260' in computer systems 500, 600 become disabled. As depicted in FIG. 5, there is a truck 700 on which the security server 500 resides and a truck 732 on which the security server 600 resides. Service managers 260, 260' correspond to the service manager 260 described with respect to FIG. 3. Computer system 500 includes modules 286, 296, 298, 272, 300, 292, 302, 304 and computer system 600 includes modules the same modules referenced with an asterisk. Each vehicle serves as a node on the two wireless system networks NET1 and NET2. As depicted in FIG. 5, there is one system network NET1 on which communication is conducted on a first frequency. There is a second network NET2 on which communication is conducted at a second frequency. There are three peer-to-peer links 720, 730, 740 within NET1 and NET2 and the truck 700. The truck 700 can communicate over wireless links to the three other three peer-to-peer links 720, 730, 740 in a known manner.

The peer-to-peer link 720 includes a truck 722, a van 724 and a truck 726, each of which is in wireless communication with each other. One of the vehicles 722, 724, 726, can serve as a central hub for communication with the other peer-to-peer links 730, 740 and the truck 700. Communication from vehicles not serving as the hub to other networks would go through the vehicle serving as the hub. Peer-to-peer communication can occur between vehicles 722, 724, 726.

The second peer-to-peer link 730 includes a truck 732 and a van 734. As in the first network, peer-to-peer wireless communication can occur between each of these vehicles. One of these vehicles would serve as the hub for communication with other peer-to-peer links 720, 740 and the truck 700.

The third peer-to-peer link 740 includes a van 742, a truck 744 and a truck 746. As before, peer to peer wireless communication can occur between each of these vehicles and communication with other networks occurs with the vehicle designated as the central hub. Truck 732 carries the computer system 600.

The computer systems 500, 600 on the trucks 700 and 732 can monitor each of the other vehicles in the network for intrusion or misuse as described above with respect to the security server 114 in FIG. 3. Each vehicle 722, 724, 726, 728, 734, 736, 742, 744, 746 would contain a computer system, such as that described above as host 112, and supporting wireless communication devices. Each computer system on a vehicle would have frameworks 410 and 420 and at least one mission. As depicted in FIG. 5, the van 724 includes missions 452–458. Each computer system would be monitored for intrusion and misuse by computer systems 500, 600 as described above with respect to the security server 114 on the secured network 100. All wireless communication between vehicles would be encrypted, but nevertheless it may be easier for an intruder to intrude into the network because of the nature of wireless communication. Should any of the vehicles become subverted then either computer system 500 or 600 could shutoff the suspected vehicle from the rest of the network. Should either truck 700 or 732 and the computer systems 500, 600 become subverted or destroyed, then the truck which is not subverted or destroyed can serve as the monitor for the entire system to prevent further subversion.

It should be noted that in an information warfare situation, where many cyber attacks are occurring simultaneously, it may be necessary to limit the number of nodes that a the computer system 500, 600 audits for intrusions or misuse because at a particular audit level, an intrusion may occur before the computer system 500, 600 can make a determination.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A method for computer network use, comprising:
   receiving audit information from an audited computer on a network, at a security computer; wherein the audit information includes an alert that an unauthorized operation has occurred at the audited computer; and
   initiating an automatic countermeasure, from the security computer, against the unauthorized operation at the audited computer wherefrom the audit information was received;
   wherein said initiating a countermeasure step includes the step of sending a transferable self-contained set of executable code instructions for implementing the countermeasure from the security computer to the computer on which the determined unauthorized operation occurred.

2. The method of claim 1, wherein said transferable self-contained set of executable code is an agent.

3. The method of claim 1, wherein auditing is performed by an audit and intrusion detection mission on a computer on the network which provides audit information to the security computer that an unauthorized operation has occurred.

4. A method for computer network use, comprising:

receiving audit information from an audited computer on a network, at a security computer; wherein the audit information includes an alert that an unauthorized operation has occurred at the audited computer; and initiating an automatic countermeasure, from the security computer, against the unauthorized operation at the audited computer wherefrom the audit information was received;

wherein said initiating a countermeasure step includes deploying a transferable self-contained set of executable code instructions at the computer on which a determined unauthorized operation occurred for misdirecting further unauthorized operation to a dummy database on the computer.

5. The method of claim 4, wherein the transferable self-contained executable code instruction is a misdirection agent.

6. The method of claim 5, wherein the misdirection agent includes a Trojan horse which can be downloaded by an actual or suspected intruder which performed the unauthorized operation.

7. The method of claim 6, wherein the Trojan horse comprises transferable self-contained executable code instructions which can be instantiated at the actual or suspected intruder's computer under instructions from the security computer.

8. A method for computer network use, comprising:

receiving audit information from an audited computer on a network, at a security computer; wherein the audit information includes an alert that an unauthorized operation has occurred at the audited computer; and initiating an automatic countermeasure, from the security computer, against the unauthorized operation at the audited computer wherefrom the audit information was received;

wherein the unauthorized operation is initiated by a computer outside the network; and wherein said initiating a countermeasure step includes deploying a transferable self-contained set of executable code instructions for implementing the countermeasure at the computer of the intruder.

9. A method for computer network use, comprising:

instantiating defensive and offensive agents at each of one or more computers;

receiving audit information from an audited computer on a network, at a security computer; wherein the audit information includes an alert that an unauthorized operation has occurred at the audited computer; and initiating an automatic countermeasure, from the security computer, against the unauthorized operation at the audited computer wherefrom the audit information was received.

10. The method of claim 9, auditing computers on the computer network and providing information from the one or more audits to a security computer on the network, and determining, based upon information provided by the auditing step, that an unauthorized intrusion has occurred at an identified audited computer.

11. The method of claim 9, wherein the taking a countermeasures step occurs automatically.

12. A method for computer network use, comprising:

receiving information, at a security computer, that an unauthorized operation has occurred at a computer or the network; and taking a countermeasure, from the security computer, against the intrusion including dispatching a transferable self-contained set of executable instructions to the identified audited computer, and automatically executing the set of executable instructions on the identified audited computer to implement the countermeasure.

13. A computer network comprising:

a security computer including one or more software modules for deploying, controlling and monitoring agents on one or more computers of the computer network;

each of said one or more computers on the computer network including a security operative which includes:

at least one offensive mission for taking countermeasures against an unauthorized operation, and a misdirection mission for misdirecting further unauthorized operations.

14. The network of claim 13, wherein the one or more software modules comprise: a response engine module for analyzing collected data reported by the defensive mission, for detecting and characterizing intrusions and misuses, for searching a countermeasure data base and for profiling user data; and a for deploying missions for tracking and controlling missions, for storing data collected by the defensive mission and for providing for system protection when a suspected or actual intrusion or misuse occurs, wherein the response engine module instructs the to take countermeasures including deploying missions and shutting down computers on the network.

15. The network of claim 13, wherein each computer includes a transferable self-contained set of executable code instructions representing a framework agent.

16. The network of claim 13, wherein said misdirection mission includes a Trojan horse.

17. The network of claim 13, wherein said defensive mission is a transferable self-contained set of executable code instructions and includes a change audit mission.

18. The network of claim 13, wherein said offensive mission is a transferable self-contained set of executable code instructions and includes a chase mission for being transferred to the suspected or actual intruder.

19. A security system comprising:

a processor;

a network interface coupling computers on a computer network; and a memory coupled to said processor storing executable code for taking countermeasures, the memory having stored therein sequences of instructions, which, when executed by said processor, cause said processor to perform the steps of:

receiving information that an unauthorized operation has occurred on a computer on the network;

taking countermeasures against the unauthorized operation including dispatching a transferable self-contained set of executable instructions to the determined computer; and executing the set of executable instructions on the determined audited computer to implement the countermeasure.

20. A computer readable medium having agents stored thereon, the agents comprising:

at least one defensive agent for monitoring for unauthorized operations on a computer within a computer network and reporting back to a security computer;

at least one misdirection agent for misdirecting requests by an actual or suspected intruder or misuser to a location in a monitored computer where the actual or suspected intruder obtains false information; and at least one offensive agent for taking countermeasures against an actual or suspected intruder to prevent or suppress further intrusion by the actual or suspected intruder.

21. A computer readable medium as in claim 20, further having executable code for:

automatically initiating countermeasures against an unauthorized operation at the monitored computer.

* * * * *